Oct. 7, 1947.   J. B. WEBB   2,428,507
APRON CONVEYOR
Filed Nov. 23, 1945

INVENTOR.
JERVIS B. WEBB
BY Joseph Farley
ATTORNEY

Patented Oct. 7, 1947

2,428,507

UNITED STATES PATENT OFFICE 2,428,507

APRON CONVEYOR

Jervis B. Webb, Bloomfield H'lls, Mich., assignor to Jervis B. Webb Company, Detroit, Mich., a corporation of Michigan Application November 23, 1945, Serial No. 630,274

6 Claims. (Cl. 198—196)

This invention relates to a pan or apron type of conveyor having a chain driving means for providing movement.

Conveyor systems of the type employed to move sand, gravel, small parts and the like have generally been constructed with bottom members and side aprons simulating insofar as possible a continuous enclosed channel with means provided in the bottom surface for preventing the load from sliding while traveling up or down an inclined plane. Such conveyors are normally provided with articulating sections which permit their travel around a sprocket at the beginning and end of a conveyor line. The use of overlapping members is generally employed in order to provide flexibility and prevent insofar as possible leakage of material carried in the conveyor. One of the principal problems in developing a conveyor of this type is to provide a construction at the joints where articulation occurs which will prevent or avoid insofar as possible leakage of material throughout the main course of the conveyor line, as well as around the forward sprocket to the point where the material carried is unloaded.

It is the principal object of the present invention to provide a new type of construction for the pan or apron members which will effectively prevent leakage of material such as sand, gravel, etc.

Another object of this invention is to provide a conveyor of extremely simple and economical construction.

A further object of the invention is to provide a means of transmitting motion to the conveyor which will utilize a chain drive preferably of the "keystone" type.

Still another object of the invention is to provide roller means for supporting the chain drive which will in turn support the load carrying members.

A still further object of the invention is to provide a bottom pan construction with overlapping members which will articulate about an axis which coincides with the axis of the supporting member which transmits the load to the chain.

Another object of the invention is to provide a means of locking adjacent pan sections in position so that the material carried will not be able to enter between the overlapping sections and thus raise them out of proper position.

A further object of the invention is to provide a tubular means of supporting the load carrying pans which will in turn be supported by cylinder extensions formed as a part of the locking pins of a chain such as the keystone chain.

Still another object of the invention is to provide overlapping side members which will prevent leakage of material when the conveyor is turning around the forward sprocket, as well as during the straightaway course of the conveyor.

A still further object of the invention is to provide an irregular line for attaching the side members to the bottom members which will add to the rigidity of such side members against bending or distortion.

Another object of the invention is to provide a bottom contour for the load carrying surface which will prevent sliding of the material when the conveyor is traveling on an incline.

These and other objects will appear more clearly from a detailed description of the preferred embodiment of the invention and from an examination of the drawings forming a part of this application wherein, Figure 1 is a transverse cross sectional elevation of the apron conveyor.

Figure 4:
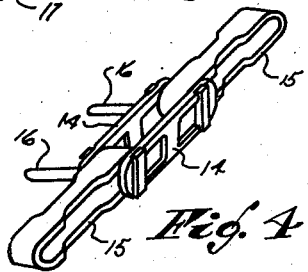

Figure 4 is a perspective view of the side bars 14 and center link 15 of the chain drive showing the special locking pin 16 used in the present construction.

In the drawings 10 represents the rotatably mounted rollers on which the driving chains 11 are carried. These rollers are provided at the outer end with flanges 12 which guide the chain drives in the correct path of the conveyor. The rollers 10 are mounted on a shaft 13 which extends through the rollers and is supported at each end by a suitable journal which will permit rotation of the shaft and rollers. Such journals, not shown, are supported in a suitable manner by the floor or structural members which form the main support for the conveyor line. The rollers 12 are spaced longitudinally at a distance equivalent to the length of several links of the chain drive and the load intermediate such rollers is carried by the chain drive itself.

Figure 1:
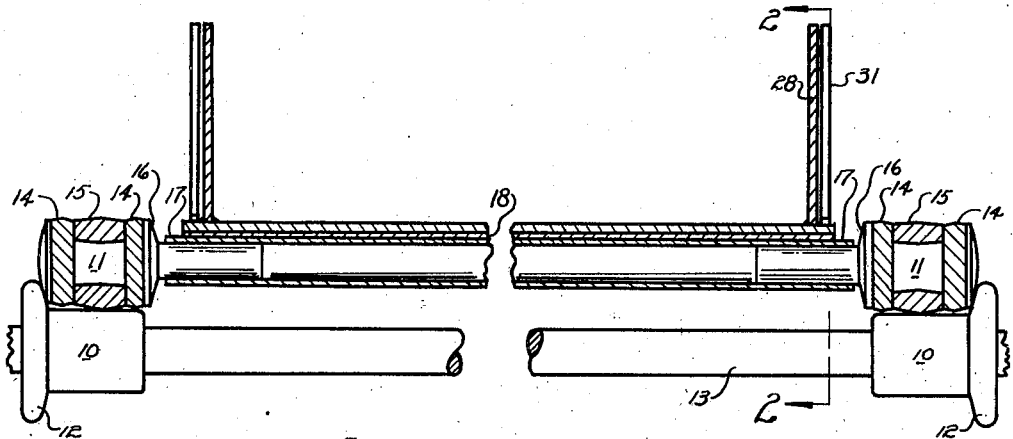
Figure 2:
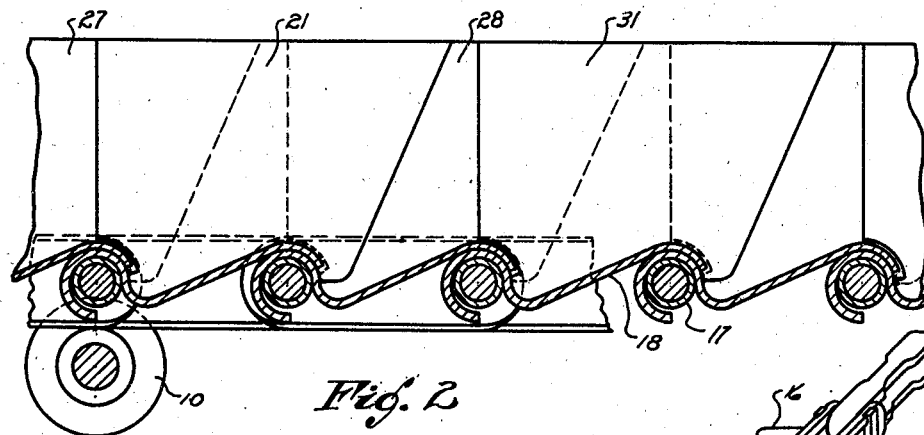
Figure 2 is a longitudinal cross sectional elevation taken along the line 2—2 of Fig. 1.
Figure 3:
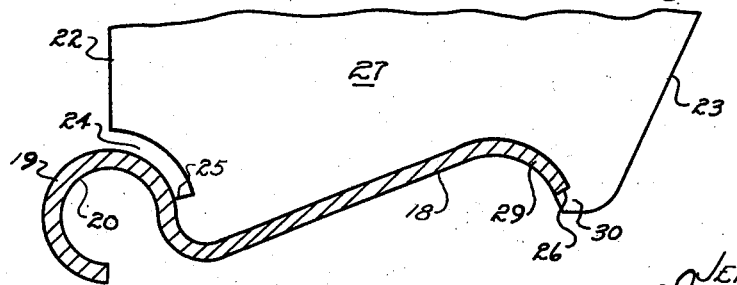
Figure 3 is a fragmentary sectional side elevation of a single bottom pan and side member showing the line of attachment between such members.

The cylindrical extension of the locking pin 16 fits into the end of the tube 17 which extends transversely across the conveyor. The bottom section of the load carrying pan 18 is formed at the rear end 19 in a generally cylindrical shape with the inside diameter 20 somewhat larger than the outside diameter of the tube 17 as shown in Figures 2 and 3.

The rear end of the pan 19 does not completely enclose the tube 17 but encircles it somewhat more than 180° and sufficiently to prevent the pan from disengaging with the tube by means other than passing the tube transversely through the cylindrical opening 20 in the pan 18.

From the rear end 19 the bottom section of the pan inclines upwards to the forward end 29 which is formed as a segment of a cylinder with the inside diameter equal to the outside diameter of the rear end 19. A side member or apron 21 is formed with the rear end 22 substantially on a perpendicular line with the center of the rear end 19 of the pan 18 and with the forward edge 23 well ahead of the center of the arc forming the forward end 29 of the pan 18 and inclined forward toward the top of the apron.

A section 24 of the rear end of the apron 21 adjacent to the rear end of the pan 19 is cut out to accommodate the forward end of the next adjacent pan. This cut out section 24 extends far enough so that when the adjacent pans are assembled on a horizontal line, some clearance will exist between the end of the cut out section 25 and the forward end of the adjacent pan 26. This permits the pans to change direction from a horizontal position to a somewhat upwardly inclined position.

The side apron just above the cut out section 24 serves to lock the forward end of the next adjacent pan in its normal overlapping position and prevents particles of the load being carried from entering between the overlapping surfaces causing them to separate and permit leakage of the material. This locking means is effective while the sections of the apron conveyor are making a turn around the sprocket as well as while they are in their normal carrying and return positions.

The apron member 21 is joined to the pan member 18 in a continuous weld from the end of the cut out section 25 to the end of the pan member 26. The construction of adjacent pan and apron members is identical except that the apron members 21 are alternately welded to overlap from the inside and from the outside the apron members of adjacent pans. The outside apron members are welded along the outside edge and the inside apron members along the inside edge in order to provide proper clearance between the overlapping apron members at the edge where they are joined to the pan members.

As shown in Figure 2, the apron member 21 overlaps from the outside the forward end of adjacent apron members 27 and the rearward end of apron 28 and apron member 28 overlaps from the inside the forward portion of 21 and rearward portion of apron member 31. The forward lower end 30 of the apron 27 is shaped to extend around the forward edge 26 of pan 18. This construction is provided in order to close up the clearance between the forward edge 26 of the pan 18 and the end 25 of the cut out section 24 of the next adjacent apron, thereby preventing any leakage of material through such clearance opening.

As shown in Figure 2, the top edges of the apron members form a substantially continuous straight line during normal operation, the height of such line determining the depth of the load that may be carried.

We see from the above description that a large number of desirable objectives have been accomplished by the above construction which is extremely economical of fabrication and assembly and which provides a strong leak-proof apron conveyor system for fine materials such as sand, gravel, etc., or for the conveyance of small miscellaneous parts. The tendency of a load to stretch conveyor members apart is entirely absorbed by the strong "keystone" chain which, in addition, serves as a drive means for the conveyor system. Thus, the only load borne by individual pan members is the vertical load of the material resting on each pan.

While the above description relates to a specific embodiment of this invention, it will be understood that numerous alterations could be made in the detail of the construction without departing from the spirit of the invention, as set out in the following claims.

I claim:

1. An endless apron conveyor characterized by transverse cylindrical load supporting members, means for movably mounting said members, bottom pan members having forward and rearward ends formed as segments of cylindrical arcs, one of said ends partially encircling and being supported by one of said transverse cylindrical members, the other of said ends overlying the first mentioned end of an adjacent bottom pan member, each of said ends articulating about the axes of said transverse cylindrical members, overlapping side apron members joined to said bottom pan members, and the said overlying end of said bottom pan members being held in position by the side apron members of adjacent pans.

2. An endless apron conveyor characterized by transverse cylindrical load supporting members, means for movably mounting said members, bottom pan members having forward and rearward ends formed as segments of cylindrical arcs, one of said ends partially encircling and being supported by one of said transverse cylindrical members, the other of said ends overlying the first mentioned end of an adjacent bottom pan member, each of said ends articulating about the axes of said transverse cylindrical members, overlapping side apron members continuously joined to said bottom pan members except at one end, where an opening is provided for accommodating the said overlying end of the adjacent bottom pan member, clearance being provided between the edge of said overlying end and the adjacent edge of said apron member to provide for limited articulation in a direction opposite to that required to make a turn at the end of the conveyor line.

3. An endless apron conveyor characterized by transverse cylindrical load supporting members, means for movably mounting said members, bottom pan members having forward and rearward ends formed as segments of cylindrical arcs, one of said ends partially encircling and being supported by one of said transverse cylindrical members, the other of said ends overlying the first mentioned end of an adjacent bottom pan member, each of said ends articulating about the axes of said transverse cylindrical members, overlapping side apron members continuously joined to said bottom pan members except at one end where an opening is provided for accommodating the said overlying end of the adjacent bottom pan member, clearance being provided between the edge of said overlying end and the adjacent edge of said apron member, the apron member attached to said overlying edge continuing around and past the edge of said end covering from the side the clearance between said edge and the adjacent apron member.

4. An endless conveyor characterized by a double endless chain drive, said chains being movably supported on rotatably mounted rollers, said chains being provided with locking pins having integrally formed cylindrical extensions, transverse tubular load supporting members being mounted at their ends on said cylindrical extensions of said locking pins and being thereby supported, bottom pan members having forward and rearward ends formed as segments of cylindrical arcs, one of said ends partially encircling and being supported by one of said transverse tubular members, the other of said ends overlying the first mentioned end of an adjacent bottom pan member, each of said ends articulating about the axes of said transverse tubular members, overlapping side apron members continuously joined to said bottom pan members except at one end where an opening is provided for accommodating the said overlying end of the adjacent bottom pan member, clearance being provided between the edge of said overlying end and the adjacent edge of said apron member, the apron member attached to said overlying edge continuing around and past the edge of said end covering from the side the clearance between said edge and the adjacent apron member.

5. An endless apron conveyor comprising a pair of laterally spaced endless chains, means of movably supporting said chains relative to a building structure, a plurality of longitudinally spaced cylindrical load supporting members mounted between said chains, a plurality of load carrying members mounted on said load supporting members in a manner permitting articulation thereon, each of said load carrying members comprising a single bottom pan and two side apron members characterized by the rearward portion of each bottom pan member being formed to partially encircle one of said cylindrical load carrying members, the central portion of each bottom pan member being formed to incline upwardly in a forward direction, the forward portion of each bottom pan member being formed to rest upon the rearward portion of the adjacent bottom pan member, and the aprons attached to said adjacent bottom pan member having their rearward portions formed to overlie said forward portion of each bottom pan member locking it into position.

6. An endless apron conveyor comprising a pair of laterally spaced endless chains, means of movably supporting said chains relative to a building structure, a plurality of longitudinally spaced cylindrical load supporting members mounted between said chains, a plurality of load carrying members mounted on said load supporting members in a manner permitting articulation thereon, each of said load carrying members comprising a single bottom pan and two side apron members characterized by the rearward portion of each bottom pan member being formed to partially encircle one of said cylindrical load carrying members, the central portion of each bottom pan member being formed to incline upwardly in a forward direction, the forward portion of each bottom pan member being formed to rest upon the rearward portion of the adjacent bottom pan member, the aprons attached to said adjacent bottom pan member having their rearward portions formed to overlie said forward portion of each bottom pan member locking it into position and the forward portions of each of said side apron members overlapping alternately from within and without the rearward portions of adjacent side apron members to an extent which prevents any opening in said side apron members which would permit leakage of material from occurring.

JERVIS B. WEBB.

REFERENCES CITED

The following references are of record in the file of this patent:

UNITED STATES PATENTS

| Number | Name | Date |
|---|---|---|
| 945,616 | Schwartz | Jan. 4, 1910 |
| 1,731,609 | Brayton | Oct. 15, 1929 |
| 2,037,904 | Hogg | Apr. 21, 1936 |